US012687393B2

(12) United States Patent
Li et al.

(10) Patent No.: US 12,687,393 B2
(45) Date of Patent: Jul. 21, 2026

(54) LEVELING METHOD AND LEVELING SYSTEM

(71) Applicant: Fulian Precision Electronics (Tianjin) Co., LTD., Tianjin (CN)

(72) Inventors: Xing-Chuan Li, Tianjin (CN); Bin-Bin Yang, Tianjin (CN); Liang Gao, Tianjin (CN); Fang-Xing Yang, Tianjin (CN); Rui-Hao Xiao, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 351 days.

(21) Appl. No.: 18/413,265

(22) Filed: Jan. 16, 2024

(65) Prior Publication Data

US 2024/0393112 A1      Nov. 28, 2024

(30) Foreign Application Priority Data

May 25, 2023      (CN) .......................... 202310605021.5

(51) Int. Cl.
*G01C 9/34*                  (2006.01)
(52) U.S. Cl.
CPC ..................................... *G01C 9/34* (2013.01)
(58) Field of Classification Search
CPC ................................. G01C 9/18; G01C 9/22
USPC .......................................................... 33/367
See application file for complete search history.

(56) References Cited

U.S. PATENT DOCUMENTS

| | | | | |
|---|---|---|---|---|
| 2,660,805 A | * | 12/1953 | Rothstein ................. | G01C 9/22 |
| | | | | 33/379 |
| 2,755,560 A | * | 7/1956 | Spaeder ................... | G01C 9/22 |
| | | | | 33/367 |
| 2,814,127 A | * | 11/1957 | Blatchford ............... | G01C 5/04 |
| | | | | 33/367 |
| 3,132,428 A | * | 5/1964 | Haissig .................... | G01C 5/04 |
| | | | | 251/207 |
| 3,310,880 A | * | 3/1967 | Watts ....................... | G01C 9/22 |
| | | | | 33/367 |
| 4,026,156 A | * | 5/1977 | Bowditch ................ | G01C 5/04 |
| | | | | 33/367 |
| 4,041,613 A | * | 8/1977 | Bishop .................... | G01C 5/04 |
| | | | | 33/367 |

(Continued)

FOREIGN PATENT DOCUMENTS

| | | | |
|---|---|---|---|
| CN | 104076828 B | * | 11/2018 |
| CN | 114608616 A | | 6/2022 |

*Primary Examiner* — George B Bennett
(74) *Attorney, Agent, or Firm* — ScienBiziP, P.C.

(57)                ABSTRACT
Disclosed in the present application are a leveling method and a leveling system. The leveling method includes providing a leveling mechanism, setting up the plurality of the first containers and connecting two adjacent first containers to each other through one connecting pipe, filling each connecting pipe with observation liquid, measuring same volume of the observation liquid using the second container and fill the observation liquid into the plurality of the first containers separately, maintaining the plurality of the first containers at same horizontal height, defining a liquid level height in the first container as a height of observation liquid level in the first container relative to the first container, and comparing the liquid level heights in the plurality of the first containers, determining the target device is in a leveling state if the liquid level heights in the plurality of the first containers are the same.

19 Claims, 5 Drawing Sheets

100

(56) References Cited

U.S. PATENT DOCUMENTS

| | | | | |
|---|---|---|---|---|
| 4,686,773 | A * | 8/1987 | Brewer | G01C 5/04 |
| | | | | 33/367 |
| 4,794,704 | A * | 1/1989 | Calcagni | G01C 5/04 |
| | | | | 33/367 |
| 4,894,924 | A * | 1/1990 | Nakanishi | G01C 5/04 |
| | | | | 33/367 |
| 4,991,302 | A * | 2/1991 | Brewer | G01C 5/04 |
| | | | | 33/367 |
| 6,249,984 | B1 * | 6/2001 | Barsky | G01C 9/06 |
| | | | | 33/366.15 |
| 9,273,988 | B2 * | 3/2016 | Olshefsky | G01F 23/00 |
| 9,995,579 | B2 * | 6/2018 | Boudin | G01C 5/04 |
| 10,495,532 | B2 * | 12/2019 | Lee | G01C 9/22 |
| 11,680,795 | B1 * | 6/2023 | Johnson | G01C 5/04 |
| | | | | 33/365 |
| 2015/0316373 | A1 * | 11/2015 | Boudin | G01C 5/04 |
| | | | | 356/482 |

* cited by examiner

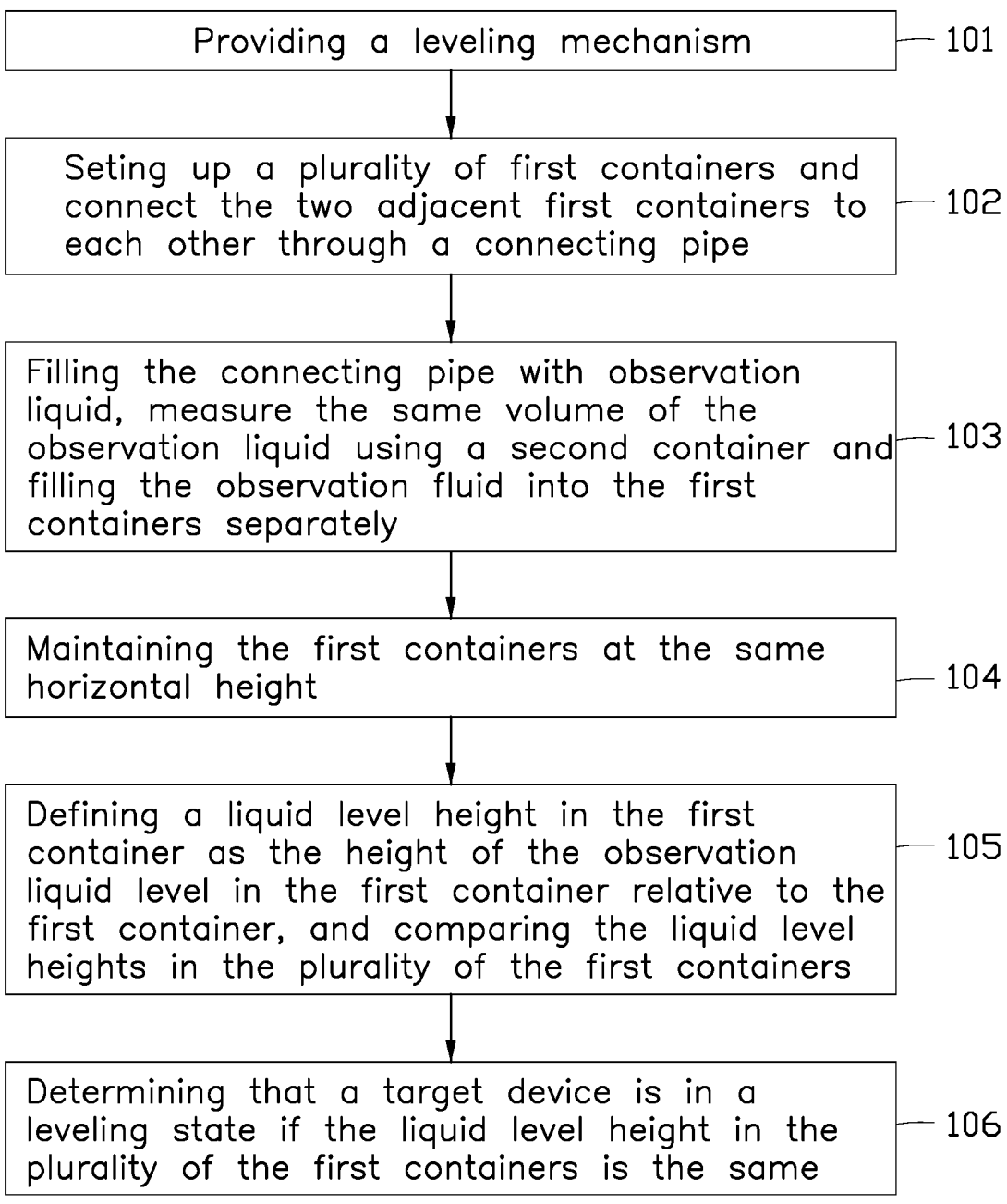

| Providing a leveling mechanism | — 101 |

| Seting up a plurality of first containers and connect the two adjacent first containers to each other through a connecting pipe | — 102 |

| Filling the connecting pipe with observation liquid, measure the same volume of the observation liquid using a second container and filling the observation fluid into the first containers separately | — 103 |

| Maintaining the first containers at the same horizontal height | — 104 |

| Defining a liquid level height in the first container as the height of the observation liquid level in the first container relative to the first container, and comparing the liquid level heights in the plurality of the first containers | — 105 |

| Determining that a target device is in a leveling state if the liquid level height in the plurality of the first containers is the same | — 106 |

LEVELING METHOD AND LEVELING SYSTEM

FIELD

The present disclosure relates to the field of mechanical devices, and specifically to a leveling method and a leveling system.

BACKGROUND

Some devices need to be horizontally balanced when in use and, therefore, need to be leveled during the installation phase of the device or prior to use.

Therefore, improvement is desired.

BRIEF DESCRIPTION OF THE DRAWINGS

FIG. 1 is a flowchart illustrating a leveling method according to an embodiment of the present disclosure.

DETAILED DESCRIPTION

Figure 2:
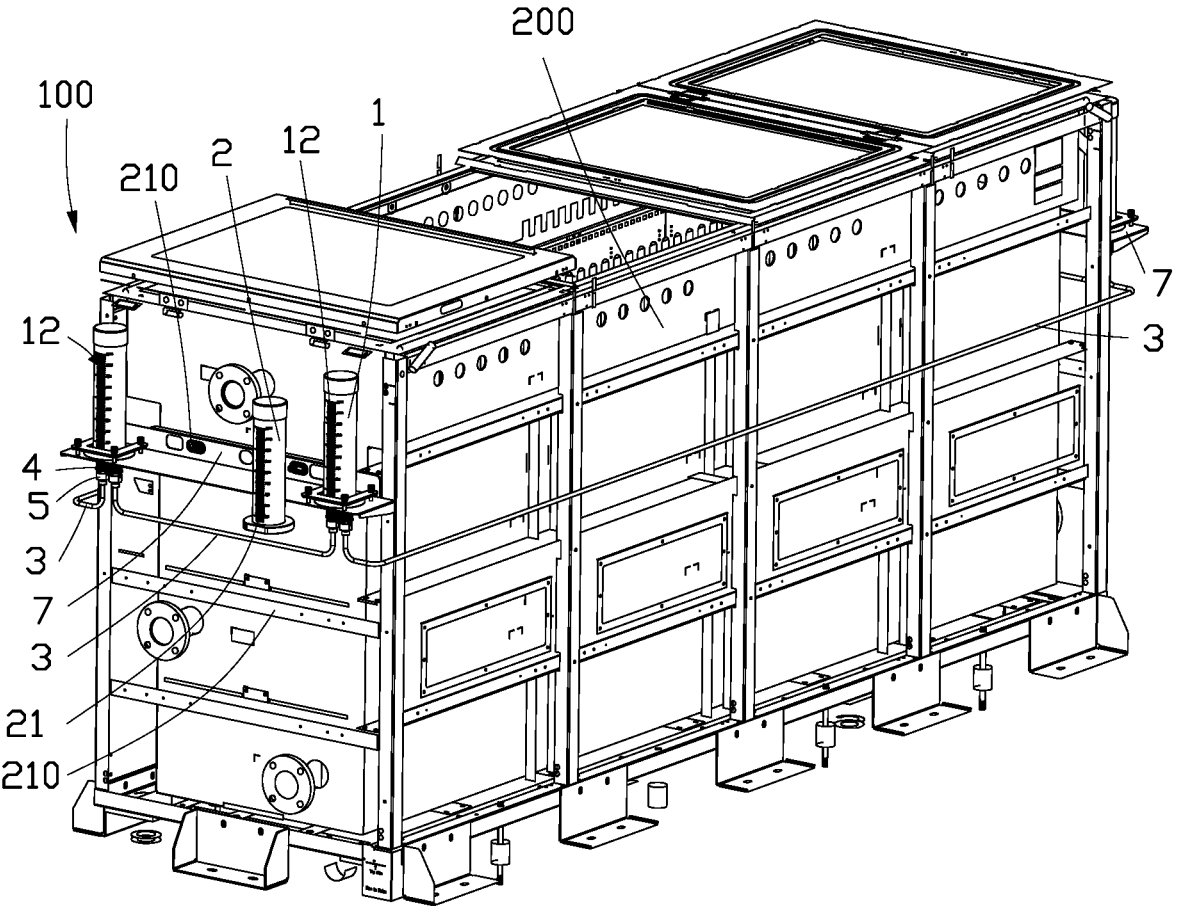
FIG. 2 is a schematic diagram illustrating a leveling system according to an embodiment of the present disclosure.

The technical solutions in the embodiments of the present disclosure will be described below in conjunction with the accompanying drawings in the embodiments of the present disclosure, and it is clear that the embodiments described are only a portion of the embodiments of the present disclosure and not all of them.

In the description of the embodiments of the present disclosure, the technical terms "first," "second," and the like are only used to distinguish different objects, and are not to be construed as indicating or implying relative importance, or implicitly specifying the number, specific order, or primary-secondary relationship of the indicated technical features. In the description of the embodiments of the present disclosure, "more than one" means more than two, unless otherwise expressly and specifically limited.

The present disclosure provides a leveling method and a leveling mechanism. The leveling mechanism includes a plurality of first containers, a second container, and a plurality of connecting pipes.

FIG. 1 is a flowchart depicting an embodiment of a leveling method, each block shown in FIG. 1 represents one or more processes, methods, or subroutines, carried out in the example method. The example method can begin at block 101.

At block 101, providing a leveling mechanism.

At block 102, setting up a plurality of first containers and connect the two adjacent first containers to each other through a connecting pipe.

At block 103, filling the connecting pipe with the observation liquid, measuring the same volume of the observation liquid using a second container and filling the observation liquid into the first containers separately.

At block 104, maintaining the first containers at the same horizontal height.

At block 105, defining a liquid level height in the first container as the height of the observation liquid level in the first container relative to the first container, and comparing the liquid level heights in the plurality of the first containers.

At block 106, determining that a target device is in a leveling state if the liquid level height in the plurality of the first containers is the same.

After the connecting pipe is filled with the observation liquid, the second container is filled with the same volume of the observation liquid to different first containers respectively, then the different first containers are the volume of the observation liquid, so that the height of the liquid level in the different first containers is the same, so that it can be determined to be leveled. The second container quantitatively measures the observation liquid, so that when the corresponding position of the first container is adjusted, directly adjusting the height of the liquid level in the first container at the position corresponding to the volume of the quantitatively measured observation liquid indicates that the corresponding position of the first container is adjusted in place, thereby avoiding repeating the adjustment of the same position when leveling.

The horizontal height of the present application may be defined as the height relative to the surface of the earth under the influence of the same force of gravity or a force equivalent to gravity.

Embodiments of the present disclosure are further described below in conjunction with the accompanying drawings.

Figure 3:
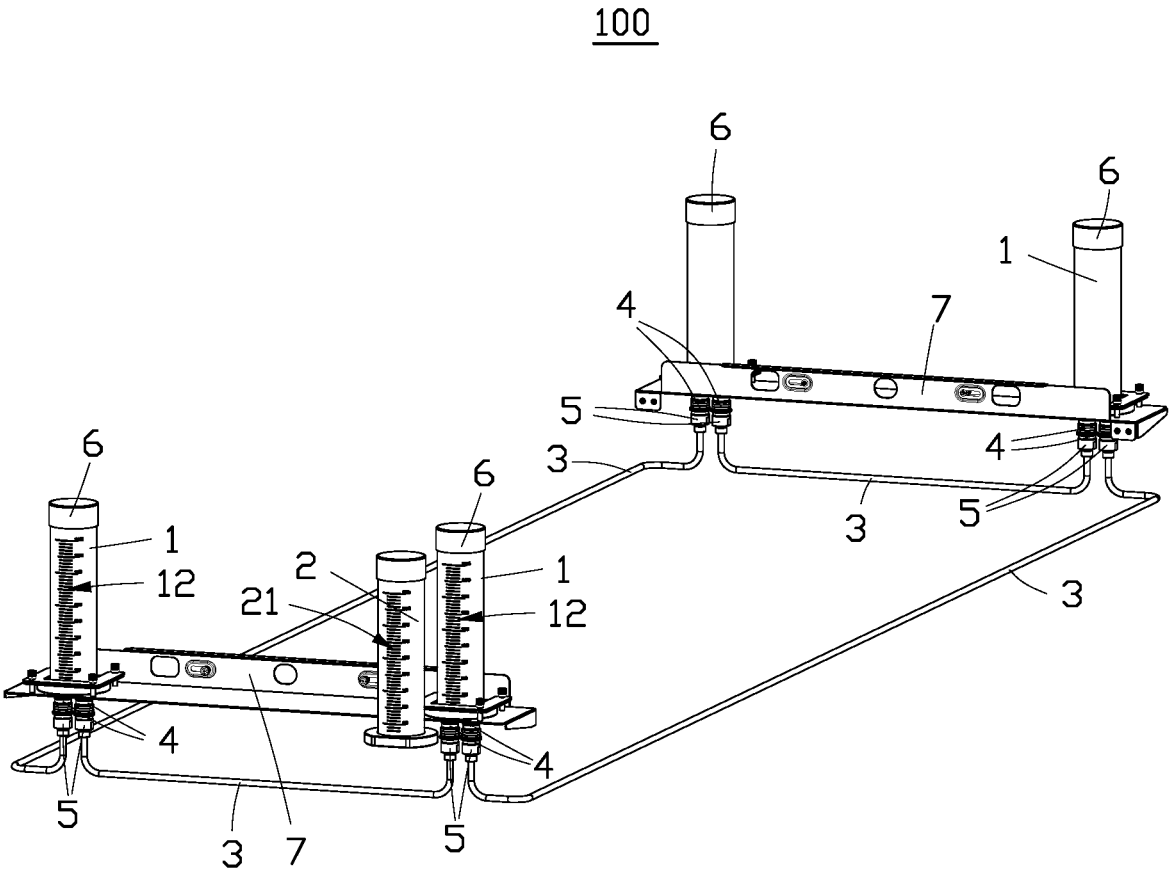
FIG. 3 is a schematic diagram illustrating a leveling mechanism of the leveling system shown in FIG. 2.

Referring to FIG. 2 and FIG. 3, the present disclosure provides a leveling method. The leveling method includes providing a leveling mechanism 100 and using the leveling mechanism 100 to level a target device 200.

The leveling mechanism 100 includes a plurality of first containers 1, a second container 2, and a plurality of connecting pipes 3. The leveling mechanism 100 of the present application can set up the plurality of the first containers 1 and connect the two adjacent first containers 1 to each other through a connecting pipe 3. The connecting pipe 3 is filled with the observation liquid, and the second container 2 is used to measure the same volume of the observation liquid, and the same volume of the observation liquid is filled into the plurality of the first containers 1 separately. The plurality of the first containers 1 are maintained at the same horizontal height. The liquid level height in the first container 1 can be defined as the height of the level of the observation liquid in the first container 1 relative to the first container 1. Under atmospheric pressure conditions, the liquid level heights in the first containers 1 can be compared, if the liquid level heights in the first containers 1 are the same, it is determined as leveling, if there is a difference in the liquid level height of the first containers 1, it is determined as not leveling.

After the connecting pipe 3 is filled with the observation liquid, the second container 2 is filled with the same volume of the observation liquid to different first containers 1 respectively, the different first containers 1 are the volume of the observation liquid, so that the height of the liquid level in the different first containers 1 is the same, so that it can be determined to be leveled. The second container 2 quantitatively measures the observation liquid, so that when the corresponding position of the first container 1 is adjusted, directly adjusting the height of the liquid level in the first container 1 at the position corresponding to the volume of the quantitatively measured observation liquid indicates that the corresponding position of the first container 1 is adjusted in place, thereby avoiding repeating the adjustment of the same position when leveling.

Figure 4:
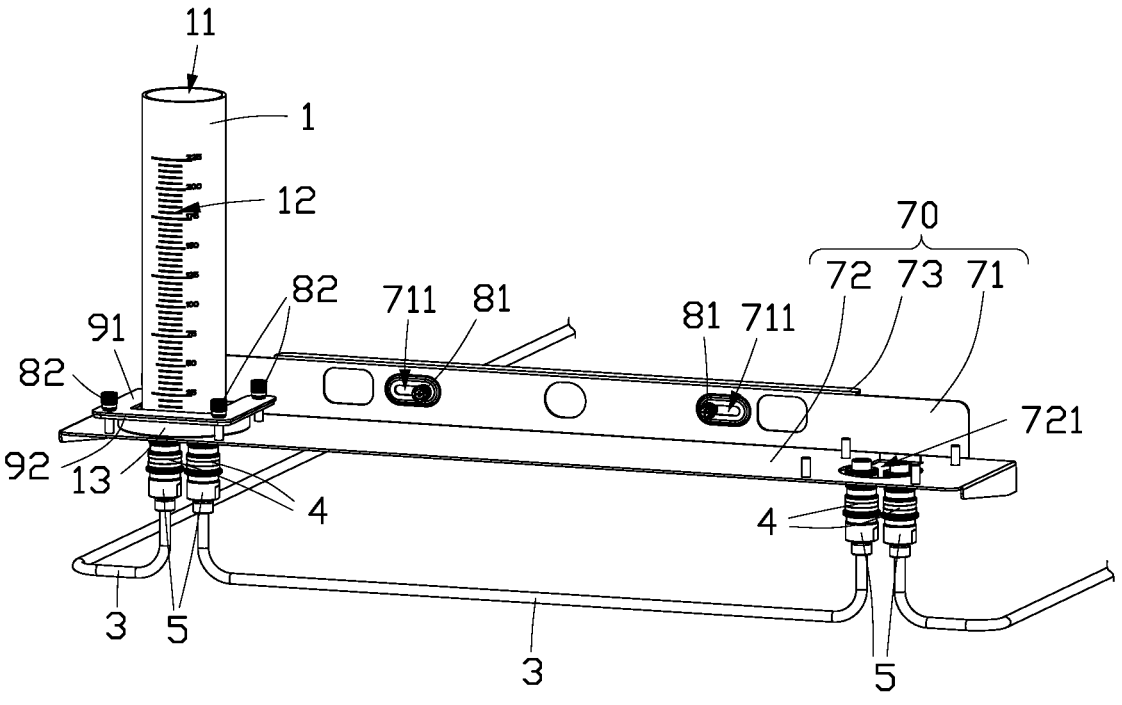
FIG. 4 is a schematic diagram of an omitted part of the leveling mechanism shown in FIG. 3.

As shown in FIG. 3 and FIG. 4, in some embodiments, the leveling method further includes the following steps: connecting the plurality of the first containers 1 with the connecting pipes 3, then fill at least one first container 1 with the observation liquid until the observation liquid can be observed in the first containers 1. Then, disconnect the first containers 1 from the connecting pipe 3 and empty the observation liquid in the first containers 1. Connect the first containers 1 with the connecting pipes 3. Finally, use the second container 2 to measure the same volume of the observation liquid and fill the first containers 1 separately.

The observation liquid is observed in each of the plurality of the first containers 1 to determine that the connecting pipe 3 is filled with the observation liquid. The observation liquid is dosed into the first container 1 after the connecting pipe 3 is filled with the observation liquid to prevent part of the dosed observation liquid from entering the connecting pipe 3 and affecting the determination of the height of the liquid level of the first container 1. Empty the excess observation liquid in the first container 1 to ensure that when comparing the liquid level in the first container 1, all the observation liquid in each of the first containers 1 is the quantitatively measured observation liquid in the second container 2.

Referring to FIG. 2 and FIG. 3, in some embodiments, the leveling mechanism 100 is used to level the target device 200. The leveling method further includes filling the connecting pipe 3 with the observation liquid. After emptying the observation liquid in the plurality of the first containers 1, the first containers 1 are connected to the target device 200, and then the second containers 2 are filled with the same volume of the observation liquid into the plurality of the first containers 1.

The leveling mechanism 100 needs to be connected to the target device 200 to construct an association with the position of the target device 200. Filling the connecting pipe 3 with observation liquid and emptying the excess observation liquid in the first container 1. It is necessary to repeatedly connect the first container 1 and the connecting pipe 3. The step of connecting the first container 1 to the target device 200 is placed after the steps of filling the connecting pipe 3 and emptying the first container 1, which facilitates the disassembly and assembly of the first container 1 and the connecting pipe 3 and avoids frequent disassembly and assembly of the first container 1 and the target device 200, which is conducive to improving the operation speed of the leveling method. In other embodiments, the first container 1 is mounted on the target device 200 before it is emptied, and the observation liquid is emptied by setting up other discharges or extracting or dismantling it again.

Referring to FIG. 3 and FIG. 4, in some embodiments, the leveling mechanism 100 further includes a plurality of first quick connectors 4 and a plurality of second quick connectors 5. Each first container 1 is equipped with a first quick connector 4, and the connecting pipe 3 is equipped with the plurality of the second quick connectors 5. The leveling method further includes the steps: plugging one first quick connector 4 into one second quick connector 5, connecting the corresponding first container 1 to the connecting pipe 3, removing one first quick connector 4 from one second quick connector 5, disconnecting the corresponding first container 1 from the connecting pipe 3, and the first quick connector 4 and the second quick connector 5 are automatically closed to stop leakage of the observation liquid. The present application can achieve the connection and disconnection of the first container 1 and the connecting pipe 3 by plugging and unplugging the first quick connector 4 and the second quick connector 5, thereby improving the speed. The first quick connector 4 and the second quick connector 5 are automatically closed after disconnection, thus avoiding leakage of the observation liquid in the first container 1 and in the connecting tube 3.

Referring to FIGS. 1 to 3, in some embodiment, the leveling method further includes the step: setting the first quick connector 4 at the bottom of the first container 1. The top of the first container 1 defines an opening 11. The leveling mechanism 100 further includes a plurality of cover bodies 6, each cover body 6 is detachably covered at an opening 11. When the leveling mechanism 100 is in use, the top of the first container 1 is located above the direction of gravity relative to the bottom.

The second container 2 fills the first container 1 with the observation liquid from the opening 11, and the first container 1 pours out the excess observation liquid through the opening 11. The cover body 6 is disposed at the opening 11 to prevent leakage of the observation liquid in the first container 1, when different target devices 200 are leveled and the leveling mechanism 100 is reinstalled, the observation liquid quantitatively filled in the first container 1 through the second container 2 can be reused, thereby simplifying the operation steps, improving the operation efficiency, and saving costs. In other embodiments, the first quick connector 4 is disposed at other positions of the first container 1.

Referring to FIG. 3 and FIG. 4, in some embodiments, the liquid level height in the second container 2 can be defined as the height of the level of the observation liquid in the second container 2 relative to the second container 2. The leveling method further includes the step: providing the first container 1 and the second container 2 with the same specifications, so that when the first container 1 and the second container 2 are filled with the same volume of observation liquid, the liquid level height inside the first container 1 is the same as the liquid level height inside the second container 2. The specifications of the first container 1 and the second container 2 are the same, the liquid level height inside the first container 1 after leveling can be directly determined by quantitatively measuring the liquid level height inside the second container 2, without the need for volume to height conversion to improve operational efficiency. In some embodiments, the first container 1 and the second container 2 have the same specifications, at least both have the same cross-sectional size of the capacity cavity.

Referring to FIG. 3 and FIG. 4, in some embodiments, the first container 1 is provided with a first liquid indication module 12, the first liquid indication module 12 can indicate information about the height of the liquid level in the first container 1. The second container 2 is provided with a second liquid indication module 21, the second liquid indication module 21 can indicate information about the height of the liquid level in the second container 2. The present application can directly know the height of the liquid level in the first container 1 and the height of the liquid level in the second container 2 by means of the information shown by the first liquid indication module 12 and the second liquid indication module 21, thereby improving accuracy. In some embodiments, the first liquid indication module 12 and the second liquid indication module 21 include at least one of a scale and a number. In other embodiments, the first liquid indication module 12 and the second liquid indication module 21 may be any form of marking similar to a scale or a number. In some embodiments, the scale is used in conjunction with a number, the number being provided between two adjacent scales. The number takes various forms, including, but not limited to, at least one of numbers, letters, colors, and text, including, but not limited to "1, 2, 3, 4 . . . ", "A, B, C, D . . . ", "a, b, c, d . . . ", "I, II, III, IV . . . ", "red, orange, yellow, green . . . " and other forms.

Figure 5:
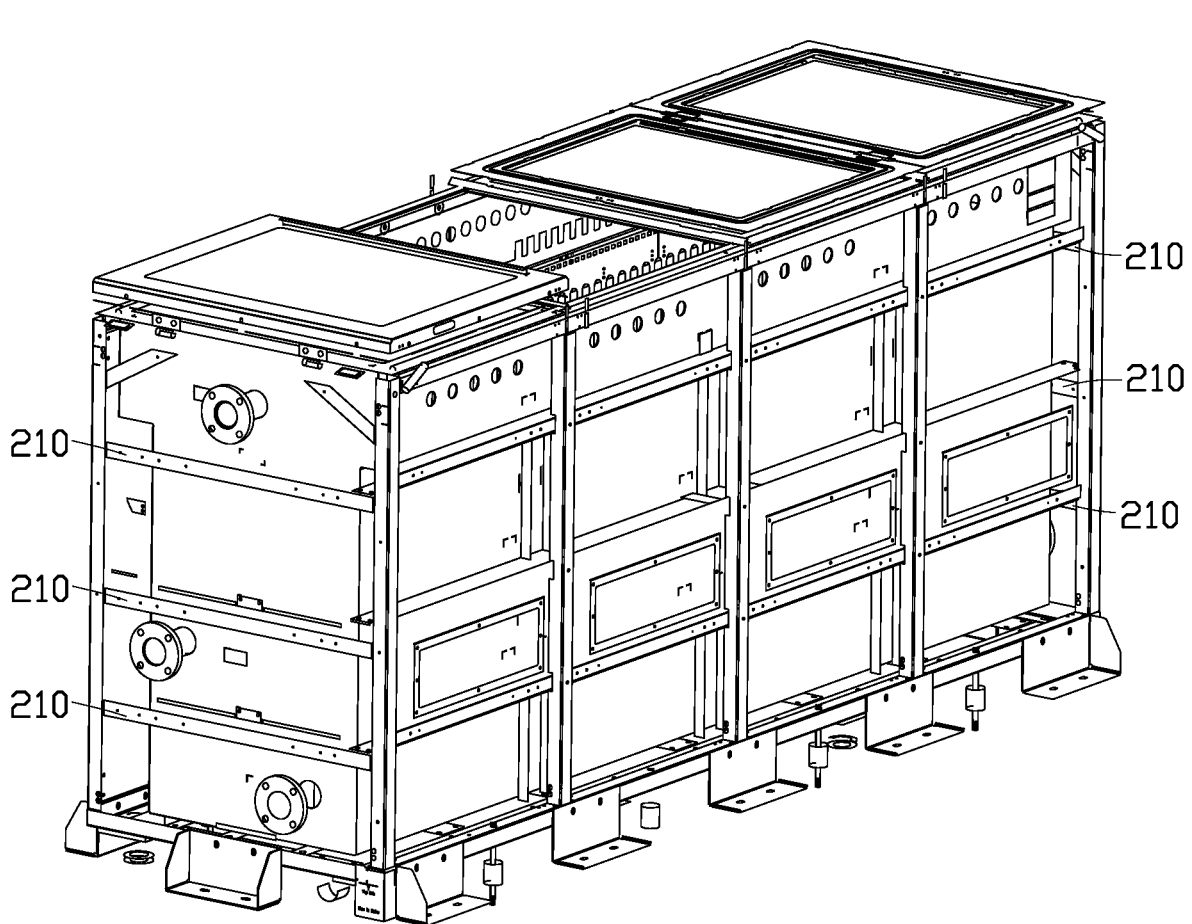
FIG. 5 is a schematic diagram illustrating a target device of the leveling system shown in FIG. 2.

Referring to FIG. 2, FIG. 3, and FIG. 5, in some embodiments, the leveling mechanism 100 is used to level the target device. The leveling method further includes the step: providing a plurality of assembly positions 210 at an outer periphery of the target device 200. The plurality of the assembly positions 210 are at the same horizontal height. Each assembly position 210 is connected to at least one first container 1. The plurality of the first containers 1 can be installed separately to the assembly positions 210 at the same horizontal height, so that the plurality of the first containers 1 are at the same horizontal height, facilitating the determination of leveling by comparing the liquid level within the plurality of the first containers 1 to be at the same height. The assembly position 210 can be a structure such as a crossbeam or frame set on the outer periphery of the target device 200. In some embodiments, the first container 1 and the connecting pipe 3 are connected to the peripheral side of the target device 200, and the plurality of the first containers 1 are spaced around the peripheral side of the target device 200. Each contact point between the target device 200 and the ground is assigned a first container 1 for accurate confirmation of whether the target device 200 is level.

In some embodiments, the first container 1 and the second container 2 include, but are not limited to, being a measuring cup.

Referring to FIG. 3 and FIG. 4, in some embodiments, the leveling mechanism 100 further includes a plurality of connecting seats 7. The connecting seat 7 includes a first plate body 71 and a second plate body 72. The leveling method includes the step: connecting a first plate body 71 to an assembly position 210, connecting at least one first container 1 to a second plate body 72, and the second plate body 72 being disposed along a horizontal plane. The first containers 1 can be provided in a second plate body 72 disposed along a horizontal plane such that the plurality of the first containers 1 are at the same horizontal height. The second plate body 72 is connected to the assembly position 210 through the first plate body 71, thereby maintaining the second plate body 72 disposed along the horizontal plane.

Referring to FIGS. 2 to 4, in some embodiments, the leveling method further includes the step: defining a plurality of waist-shaped holes 711 in the first plate body 71. The plurality of the waist-shaped holes 711 are distributed in a horizontal direction, and each of the waist-shaped holes 711 extends in the horizontal direction. The leveling mechanism 100 further includes a plurality of first fasteners 81, each of the first fasteners 81 threads a waist-shaped hole 711 to connect the first plate body 71 to the assembly position 210. Each connecting seat 7 has a convex plate 73, and the convex plate 73 is connected to the first plate body 71. After pressing the convex plate 73 against the top of the assembly position 210, the first fastener 81 is threaded through the waist-shaped hole 711. The first plate body 71, the second plate body 72 and the convex plate 73 are integrally provided. By adjusting the position of the first fastener 81 within the waist-shaped hole 711, the connecting plate is adapted to fit more assembly positions 210, so that the leveling mechanism 100 is adapted to fit more specifications and models of the target device 200. The convex plate 73 resists the top of the assembly bit 210, enabling the target device 200 to provide support to the attachment seat 7 in the direction of gravity, facilitating the assembly of the first fastener 81, and enabling a single person to complete the attachment and fixing of the leveling mechanism 100 to the target device 200. In some embodiments, when the connecting seat 7 is fixedly connected to the assembly position 210 of the target device 200, the first plate body 71 is set perpendicular to the horizontal plane, and the second plate body 72 and convex plate 73 are set parallel to the horizontal plane. The top side of the first board body 71 is connected to one side of the convex plate 73, the convex plate 73 extends towards the target device 200. The bottom side of the first board body 71 is connected to one side of the second board body 72, and the second board body 72 extends away from the target device 200. The first plate body 71 needs to be adjusted to remain horizontal when the first plate body 71 connected to the target device 200 as much as possible. Therefore, the first plate body 71 needs to have sufficient extension length in the horizontal direction, and the convex plate 73 overlaps with the top of the assembly position 210 to achieve prepositioning of the first plate body 71.

Referring to FIG. 3 and FIG. 4, in some embodiments, the leveling method further includes the step: defining a connecting port 721 on the second board body 72. The bottom of the first container 1 is provided with a base 13. The leveling mechanism 100 further includes a clamp plate 91 and a second fastener 82. The base 13 is disposed on the upper side of the second plate body 72. The clamp plate 91 is placed on the upper side of the base 13, and the clamp plate 91 is connected to the second plate body 72 through the second fastener 82. The first container 1 is connected to the connecting pipe 3 through the connecting port 721. In some embodiments, the first quick connector 4 is disposed on the lower side of the base 13 to enhance the connection stability of the first container 1 and facilitate the observation of the height of the liquid level in the first container 1 through the clamping fit between the clamp plate 91 and the second plate body 72. The first container 1 is placed on the upper side of the second plate body 72 for installing, thereby making it convenient to connect and fix the first container 1 through the clamp plate 91 and the second fastener 82. The first container 1 can be placed above the connecting port 721, so that the second plate body 72 provides more support to the first container 1 and improves the stability of the first container 1. In some embodiments, the leveling mechanism 100 further includes a gasket 92, the gasket 92 is made of rubber material. The gasket 92 is placed between the clamp plate 91 and the base 13 to distribute the clamping force of the clamp plate 91 more evenly.

Referring to FIG. 3 and FIG. 4, in some embodiments, there can be a plurality of the connecting pipes 3, the two ends of the connecting pipe 3 are respectively connected to a first container 1. In other embodiments, the connecting pipe 3 can be one, and one connecting pipe 3 is connected to the plurality of the first containers 1 by setting a plurality of interfaces.

Referring to FIG. 2 and FIG. 5, in some embodiments, the target device 200 is a liquid cooling device, a device such as a server is placed inside the target device 200 and filled with coolant into the target device 200, by leveling the target device 200 to ensure that the device such as a server can be fully submerged in the coolant. In other embodiments, the target device 200 may be other devices that need to be leveled.

Referring to FIGS. 2 to 4, the present application provides a leveling system 300. The leveling system 300 includes a leveling mechanism 100 and a target device 200. The leveling mechanism 100 includes a plurality of first containers 1, a second container 2, a plurality of connecting pipes 3, a first quick connector 4, a second quick connector 5, a plurality of cover bodies 6, a plurality of connecting seats 7, a first fastener 81, a second fastener 82, a clamp plate 91, and a gasket 92. The plurality of the first containers 1 are disposed at different assembly positions 210 of the target device 200. The plurality of the first containers 1 are connected to each other by a connecting tube 3. The second container 2 is used to quantitatively measure the observation liquid. Each first container 1 is used to contain the observation liquid quantitatively measured in the second container 2, and each first container 1 can observe the height of the liquid level of the observation liquid contained in the first container 1 relative to the first container 1. After installing the leveling mechanism 100 on the target device 200, the leveling method described in any of the above embodiments is applied to level the target device 200. In one embodiment, the target device 200 is a liquid cooling tank, the liquid cooling tank being used to store the coolant for cooling a data processing device, the data processing device may be a server or a data processing module or a circuit board template, for example. The plurality of the first containers 1 may be installed at different locations on the outside of the liquid cooling tank, or at different locations on the inside of the liquid cooling tank and exposed on the outside of the liquid cooling tank.

Referring to FIGS. 2 to 4, in the present application, the operational steps of the leveling method includes: connecting the first plate body 71 of the connecting seat 7 to the assembly position 210 of the target device 200 with the first fastener 81; interconnecting the plurality of the first containers 1 through the plurality of the connecting pipes 3, filling the plurality of the first containers 1 with the observation liquid until the observation liquid can be observed in all of the plurality of the first containers 1; disconnecting the first quick connector 4 from the second quick connector 5, pouring out the observation liquid in the first container 1, and plugging the first quick connector 4 into the second quick connector 5; clamping the first container 1 to the second plate body 72 with the second fastener 82 and the clamp plate 91; quantitatively measuring the observation liquid with the second container 2, recording the height of the liquid level in the second container 2 and filling it into the plurality of the first containers 1 respectively; adjusting a position of the target device 200 until the height of the liquid level in the first container 1 corresponding to the position is the same as the recorded height of the liquid level in the second container 2; adjusting various positions of the target device 200 until all of the liquid level heights in the first container 1 are the same as the recorded liquid level heights in the second container 2; completing the leveling of the target device 200, setting the cover body 6 over the opening of the first container 1, detaching the connecting seat 7 from the assembly position 210 of the target device 200 and connecting the connecting seat 7 to the assembly position 210 of another target device 200, and leveling another target device 200.

Those of ordinary skill in the art should realize that the above embodiments are only used to illustrate the present disclosure, but not to limit the present disclosure. As long as they are within the essential spirit of the present disclosure, the above embodiments are appropriately made and changes fall within the scope of protection of the present disclosure.

What is claimed is:

1. A leveling method configured for leveling a target device and comprising:

providing a leveling mechanism; wherein the leveling mechanism comprises a plurality of first containers, a second container, and a connecting pipe;

setting up the plurality of first containers, connecting two adjacent first containers of the plurality of first containers to each other through the connecting pipe, filling the connecting pipe with observation liquid, measuring a volume of the observation liquid with the second container, and filling the observation liquid, in the measured volume, into each of the plurality of first containers;

determining the target device is in a leveled state if liquid level height in each of the plurality of first containers is the same.

2. The leveling method of claim 1, wherein the connecting two adjacent first containers of the plurality of first containers to each other through a connecting pipe, filling the connecting pipe with observation liquid, measuring a volume of the observation liquid with the second container, and filling the observation liquid, in the measured volume, into each of the plurality of first containers further comprises:

connecting the plurality of first containers with the connecting pipe, and filling at least one first container with the observation liquid until the observation liquid observed in the plurality of first containers; disconnecting the plurality of the first containers from the connecting pipe, emptying the observation liquid in the plurality of first containers, connecting the plurality of first containers with the connecting pipe, and measuring the same volume of the observation liquid with the second container to separately fill the plurality of first containers.

3. The leveling method of claim 2, further comprising:

filling the connecting pipe with the observation liquid, after emptying the observation liquid in the plurality of first containers, connecting the plurality of first containers to the target device, and measuring the same volume of the observation liquid with the second container and filling the same volume of the observation liquid into the plurality of first containers respectively.

4. The leveling method of claim 2, wherein the leveling mechanism further comprises a first quick connector and a second quick connector, each first container is provided with a plurality of first quick connectors, and the connecting pipe is provided with a plurality of second quick connectors, the leveling method comprises:

plugging a first quick connector into a second quick connector, and connecting a corresponding first container to the connecting pipe;

removing one first quick connector from one second quick connector, disconnecting the corresponding first container from the connecting pipe, and automatically sealing the first quick connector and the second quick connector to prevent leakage of the observation liquid.

5. The leveling method of claim 4, further comprising:

setting the first quick connector at a bottom of the first container;

wherein a top of each first container in plurality of first containers defines an opening, and the leveling mechanism further comprises a plurality of cover bodies, and each cover body is detachably covered at one opening.

6. The leveling method of claim 1, further comprising:
providing the plurality of first containers and the second container with same specifications.

7. The leveling method of claim 1, further comprising:
setting a plurality of assembly positions on a periphery of the target device,
wherein the plurality of assembly positions at same horizontal height, and each assembly position is connected to at least one first container.

8. The leveling method of claim 7, wherein the leveling mechanism further comprises a plurality of connecting seats, each connecting seat comprises a first plate body and a second plate body, the leveling method further comprises:
connecting a first plate body to an assembly position, connecting at least one first container to a second plate body, wherein the second plate body is arranged along a horizontal plane.

9. The leveling method of claim 8, further comprising:
defining a plurality of holes in the first plate body, wherein the plurality of the holes is distributed in a horizontal direction, each hole extends in the horizontal direction; wherein the leveling mechanism further comprises a plurality of first fasteners, each first fastener threads one hole to connect the first plate body to the assembly position;
wherein each connecting seat has a convex plate, the convex plate is connected to the first plate body, after the convex plate is pressed against a top of the assembly position, the first fastener is threaded through the hole.

10. The leveling method of claim 8, further comprising:
defining a connecting port on the second plate body, wherein a base is provided at the bottom of each first container in plurality of first containers;
wherein the leveling mechanism further comprises a clamp plate and a second fastener, the base is placed on an upper side of the second plate body, the clamp plate is placed on an upper side of the base, and the clamp plate is connected to the second plate body with the second fastener, and each first container in plurality of first containers is connected to the connecting pipe through the connecting port.

11. A leveling method configured for leveling a target device and comprising:
providing a leveling mechanism; wherein the leveling mechanism comprises a plurality of first containers, a second container, and a connecting pipe;
setting up the plurality of first containers,
connecting two adjacent first containers of the plurality of first containers to each other through a connecting pipe, filling the connecting pipe with observation liquid, measuring a volume of the observation liquid with the second container, and filling the observation liquid, in the measured volume, into each of the plurality of first containers;
determining the target device is in a leveled state if liquid level height in each of the plurality of first containers is the same;
providing the first container and the second container with same specifications.

12. The leveling method of claim 11, further comprising:
filling the connecting pipe with the observation liquid, after emptying the observation liquid in the plurality of first containers, connecting the plurality of first containers to the target device, and measuring the same volume of the observation liquid with the second container and filling the same volume of the observation liquid into the plurality of first containers respectively.

13. The leveling method of claim 12, wherein the leveling mechanism further comprises a first quick connector and a second quick connector, each first container is provided with a plurality of first quick connectors, and the connecting pipe is provided with a plurality of second quick connectors, the leveling method comprises:
plugging a first quick connector into a second quick connector, and connecting a corresponding first container to the connecting pipe;
removing one first quick connector from one second quick connector, disconnecting the corresponding first container from the connecting pipe, and automatically sealing the first quick connector and the second quick connector to prevent leakage of the observation liquid.

14. The leveling method of claim 13, further comprising:
setting the first quick connector at a bottom of the first container;
wherein a top of the first container defines an opening, and the leveling mechanism further comprises a plurality of cover bodies, and each cover body is detachably covered at one opening.

15. The leveling method of claim 11, further comprising:
setting a plurality of assembly positions on a periphery of the target device,
wherein the plurality of assembly positions at same horizontal height, and each assembly position is connected to at least one first container.

16. The leveling method of claim 15, wherein the leveling mechanism further comprises a plurality of connecting seats, each connecting seat comprises a first plate body and a second plate body, the leveling method further comprises:
connecting a first plate body to an assembly position, connecting at least one first container to a second plate body, wherein the second plate body is arranged along a horizontal plane.

17. The leveling method of claim 16, further comprising:
defining a plurality of holes in the first plate body, wherein the plurality of the holes is distributed in a horizontal direction, each hole extends in the horizontal direction; wherein the leveling mechanism further comprises a plurality of first fasteners, each first fastener threads one hole to connect the first plate body to the assembly position;
wherein each connecting seat has a convex plate, the convex plate is connected to the first plate body, after the convex plate is pressed against a top of the assembly position, the first fastener is threaded through the hole.

18. The leveling method of claim 16, further comprising:
defining a connecting port on the second plate body, wherein a base is provided at the bottom of the first container;
wherein the leveling mechanism further comprises a clamp plate and a second fastener, the base is placed on an upper side of the second plate body, the clamp plate is placed on an upper side of the base, and the clamp plate is connected to the second plate body with the second fastener, and the plurality of first containers is connected to the connecting pipe through the connecting port.

19. A leveling system comprising:

a liquid cooling tank configured to store coolant for cooling a data processing device;

a leveling mechanism comprising a plurality of first containers, a second container, and a connecting pipe; wherein the plurality of the first containers are installed at different positions on an outer side of the liquid cooling tank, or at different positions on an inner side of the liquid cooling tank and exposed on the outer side of the liquid cooling tank; the plurality of the first containers are interconnected through the connecting pipe, the second container is configured for quantitatively measuring the observation liquid, and each first container is configured to hold quantitatively measured observation liquid in the second container, and each first container observes a height of the liquid level of the observation liquid in the first container relative to the first container.

\* \* \* \* \*